US012280477B1

(12) United States Patent
Vannemreddi et al.

(10) Patent No.: US 12,280,477 B1
(45) Date of Patent: Apr. 22, 2025

(54) RAMP LOCK EXTRACTOR TOOLS, SYSTEMS, AND METHODS FOR DISASSEMBLING MUTLIPART COMPONENT BODIES

(71) Applicant: GM GLOBAL TECHNOLOGY OPERATIONS LLC, Detroit, MI (US)

(72) Inventors: Veeraraghavulu Vannemreddi, Farmington, MI (US); Alejandro E. Carrillo, Clarkston, MI (US); Ian J. Phillips, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/733,261

(22) Filed: Jun. 4, 2024

(51) Int. Cl.
*B25B 27/04* (2006.01)

(52) U.S. Cl.
CPC .................................... *B25B 27/04* (2013.01)

(58) Field of Classification Search
CPC ...... F16B 5/10; F16B 21/04; Y10T 29/53683; H05K 13/0491
See application file for complete search history.

(56) References Cited

U.S. PATENT DOCUMENTS 1,358,679 A * 11/1920 Hall .......................... B25B 9/00 29/239
1,726,532 A * 9/1929 Andel ..................... B25B 27/02 29/277
1,804,935 A * 5/1931 Jacobus .................. B23P 19/00 29/239
2,340,598 A * 2/1944 Kerzak ................... B25B 27/02 29/254
4,610,064 A * 9/1986 Verstraeten ........... F16L 23/006 29/256
8,657,545 B2 * 2/2014 Magno, Jr. .............. F16B 7/187 248/316.1
10,084,498 B2 9/2018 Kotzer et al.
11,924,975 B1 * 3/2024 Mullert ................... B25B 27/02
2021/0075800 A1 3/2021 Paraskevas et al.

FOREIGN PATENT DOCUMENTS

DE 202016103046 U1 * 8/2016
GB 107151 A * 6/1917
JP 2008095720 A * 4/2008

OTHER PUBLICATIONS

English Translation of JP-2008095720-A (Year: 2008).*

* cited by examiner

*Primary Examiner* — Jacob J Cigna
(74) *Attorney, Agent, or Firm* — Quinn IP Law

(57) ABSTRACT

Presented are ramp lock extractor (RLE) lift tools for disassembling multipart assemblies, methods for making/using such lift tools, and vehicles with multipart assembly modules disassembled by such lift tools. A method of separating first and second component bodies joined together via an adhesive includes aligning an RLE lift tool with an RLE key slot that extends through the first component body. The lift tool includes multiple ramp pins projecting outward from lateral sides of a tool stem. The key slot includes multiple helical ramps located on lateral sides of a through-hole. The lift tool inserts into the key slot until a distal tip of the tool stem abuts the second component body. The lift tool rotates within the key slot to slide the ramp pins along the helical ramps, causing the tool stem's distal tip to press against the second component body and thereby separate the two component bodies.

20 Claims, 2 Drawing Sheets

RAMP LOCK EXTRACTOR TOOLS, SYSTEMS, AND METHODS FOR DISASSEMBLING MUTLIPART COMPONENT BODIES

INTRODUCTION

The present disclosure relates generally to components with multipart bodies. More specifically, aspects of this disclosure relate to tools and processes for disassembling electronic components with multipart metal-cast bodies joined by metal-to-metal adhesives.

Current production motor vehicles, such as the modern-day automobile, are originally equipped with a network of onboard controllers, sensors, communications devices, accessories, and assorted other electronic components that are distributed across the vehicle body. With the continued increase in power and processing demands for these vehicle components comes a concomitant increase in waste heat generated during operation of the motor vehicle. To prolong operation of the vehicle's various electronic components, most motor vehicles utilize passive and active thermal management features to regulate component operating temperature. The vehicle's powertrain control module (PCM), for example, may be typified by an integrated electronic control unit (ECU) with multiple system-on-chip (SOC) printed circuit board assemblies that are sealed inside a metal cartridge. The ECU cartridge may be securely mounted by a thermally conductive metal-to-metal adhesive onto a cast-metal housing of a traction motor/generator unit (MGU). This adhesive bond thermally couples the ECU to the MGU in order to transfer heat from the ECU cartridge to the MGU housing, which has a larger thermal mass as well as active coolant channels for dissipating heat. It may become necessary to repair or replace the ECU; however, the metal-to-metal adhesive forms a high-strength "weld-like" joint that is not easily severed with standard hand tools.

SUMMARY

Presented below are ramp lock extractor (RLE) lift tools for disassembling multipart components, methods for making and methods for using such RLE lift tools, and motor vehicles with electronic components having multipart metal-cast bodies that are disassembled by such RLE lift tools. By way of illustration, and not limitation, an RLE key slot with a pair of helical ramps is formed or machined through an upper cast body (e.g., cast-aluminum cartridge of a central computer unit (CCU)) that is bonded onto a support surface of a lower cast body (e.g., cast-aluminum chassis of an electronic drive unit (EDU)) by a thermally conductive adhesive (e.g., indium-based composite thermal interface material (TIM) paste). A high-strength metal RLE lift tool inserts into the complementary RLE key slot such that a distal tip of the tool abuts the support surface of the lower cast body. The lift tool includes an elongated stem with a pair of ramp pins that project outward from opposing sides of the stem. Once inserted into the key slot, the lift tool is rotated, e.g., about 90 degrees, such that the ramp pins slide along and press against underside surfaces of the key slot's helical ramps, causing the distal tip of the stem to press against the lower cast body. Doing so will fracture the adhesive bond and lift the upper cast body off of the lower cast body.

For at least some applications, the RLE lift tool is a machined-steel component that is fabricated as a one-piece structure with the stem projecting coaxially from a distal end of a hex-head drive shank. The lift tool's drive shank and stem may both have right-circular cylinder geometries with the drive shank having a larger diameter than the stem. As a further option, the ramp pins may have right-circular cylinder geometries and may project radially outward from diametrically opposite sides of the stem. An optional nylon pad may be fixed to the distal tip of the stem or onto the mounting surface of the lower cast body to insert between the lift tool and the lower cast body to facilitate rotation of the tool and protect the cast body. It is also envisioned that the key slot may be cast or machined as a through-hole that extends through the mating halves of the CCU cartridge, and the helical ramps may be integrated into the lower half of the cartridge. Each helical ramp may be arcuate with a central arc angle of 90°, and each ramp may be located on an opposite side of the key slot.

Aspects of this disclosure are directed to simplified, low-cost, and efficient processes for disassembling multipart components without damaging the components. In an example, a method is presented for separating first and second component bodies that are joined together via an adhesive. This representative method includes, in any order and in any combination with any of the above and below disclosed options and features: aligning an RLE lift tool with an RLE key slot, which extends through the first component body, the RLE lift tool including multiple ramp pins projecting outward from lateral sides of a tool stem, and the RLE key slot including multiple helical ramps located on lateral sides of a through-hole; inserting the RLE lift tool into the RLE key slot such that a distal tip of the tool stem abuts the second component body; and rotating the RLE lift tool within the RLE key slot such that the ramp pins slide along the helical ramps, causing the lift tool to translate and the tool stem's distal tip to press against the second component body and thereby separate the first component body from the second component body.

Additional aspects of this disclosure are directed to ramp lock extractor lift tools for separating component bodies that are joined together via an adhesive. In an example, an RLE lift tool includes a cylindrical tool stem that is formed, in whole or in part, from a metallic material. The tool stem is structurally shaped and sized to align with and insert into a complementary RLE key slot that extends through a first (upper) component body. The RLE key slot includes a through-hole with first and second helical ramps located on opposing lateral sides of the through-hole. A distal tip of the tool stem is structurally shaped and sized to abut the second component body when the RLE lift tool is inserted into the RLE key slot. First and second cylindrical ramp pins are integrally formed with and project radially outward from opposing lateral sides of the tool stem, diametrically opposite each other. The tool stem is structurally shaped and sized to be rotated within the RLE key slot. By rotating the RLE lift tool within the RLE key slot, the ramp pins are structurally shaped and sized to slide along underside surfaces of the helical ramps; doing so causes the lift tool to translate rectilinearly towards a second (lower) component body, which causes the tool stem's distal tip to press against the second component body to thereby rupture the adhesive and lift the first component body from the second component body.

Further aspects of this disclosure are directed to ramp lock extractor systems for disassembling multipart component bodies. In an example, an RLE system includes a first component body that mounts onto a second component body via an adhesive. The first component body is fabricated with an RLE key slot that extends through the first component body. This RLE key slot includes a through-hole with multiple helical ramps located on lateral sides of the through-hole. The RLE system also includes an RLE lift tool that is fabricated with multiple ramp pins that project outward from lateral sides of a tool stem. The tool stem is structurally configured to align with and insert into the RLE key slot such that a distal tip of the tool stem abuts the second component body. The tool stem is also structurally configured to be rotated within the RLE key slot. The ramp pins are structurally configured to slide along the helical ramps by rotating the RLE lift tool within the RLE key slot. Doing so presses the distal tip of the tool stem against the second component body, which in turn causes the adhesive to rupture and separates the first component body from the second component body.

For any of the disclosed ramp lock extractor tools, systems, and methods, the RLE lift tool may include first and second ramp pins that project radially outward from opposing first and second lateral sides, respectively, of the tool stem. In this instance, the first ramp pin may have a first cylindrical shape with a first diameter, and the second ramp pin may have a second cylindrical shape with a second diameter. The ramp pins may share a common cylindrical shape with a common shared diameter. As a further option, the shared cylindrical shape of the ramp pins may be a right-circular cylinder. Moreover, the first ramp pin may be diametrically opposite the second ramp pin such that the ramp pins project in opposite directions from each other. It may be desirable that the RLE lift tool, including the tool stem, ramp pins, and drive shank, be integrally formed as a single-piece structure, e.g., from high-strength metallic, polymeric, and/or composite materials.

For any of the disclosed ramp lock extractor tools, systems, and methods, the RLE lift tool may include a hex-head drive shank with a hexagonal crown at a proximal end of the drive shank and the tool stem projecting coaxially from a distal end of the drive shank. In this instance, the hex-head drive shank of the RLE lift tool may insert into a complementary hexagonal drive socket that is integral with or fixed to a manual tool handle or an electric power drill. As a further option, the diameters of the ramp pins may be smaller than the diameter of the hex-head drive shank and the diameter of the tool stem. It is envisioned that disclosed RLE lift tools, systems, and methods may be utilized for electronic and non-electronic components, metallic and non-metallic component bodies, as well as automotive and non-automotive applications.

For any of the disclosed ramp lock extractor tools, systems, and methods, the RLE key slot may include first and second helical ramps located on opposing first and second lateral sides, respectively, of the RLE key slot. Each helical ramp may be arcuate, with a central arc angle of approximately 90 degrees or less. As a further option, the helical ramps may each terminate at a respective ramp wall, e.g., located at bottom-most ends of the ramps. Moreover, the helical ramps may have a longitudinal height that extends less than half a longitudinal length of the RLE key slot. A top-most end of the RLE key slot may have an irregularly shaped key hole that is shaped and sized to receive therethrough the tool stem and ramp pins of the RLE lift tool.

For any of the disclosed ramp lock extractor tools, systems, and methods, the distal tip of the tool stem includes a nylon pad or other compressible polymeric material. In this instance, inserting the RLE lift tool into the RLE key slot will seat the nylon pad against a portion of the second component body that is not covered in the adhesive. While not per se limited, it may be desirable that the first component body is formed, in whole or in part, from a first metallic material (e.g., cast aluminum), the second component body is formed, in whole or in part, from a second metallic material (e.g., cast aluminum), and the RLE lift tool is formed, in whole or in part, from a third metallic material (e.g., cast steel) that is distinct from and stiffer than both the first and second metallic materials. In this instance, the adhesive is a thermally conductive metal-to-metal adhesive (e.g., high-strength, pressure sensitive TIM paste). Alternatively, the bonded components may be fabricated from other rigid and resilient materials, including ceramic, polymeric, and composite materials, the lift tool may be fabricated from high-strength plastic materials, and the adhesive may be a commercial grade plastic-to-plastic, plastic-to-metal, ceramic-to-ceramic, etc., adhesive material.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
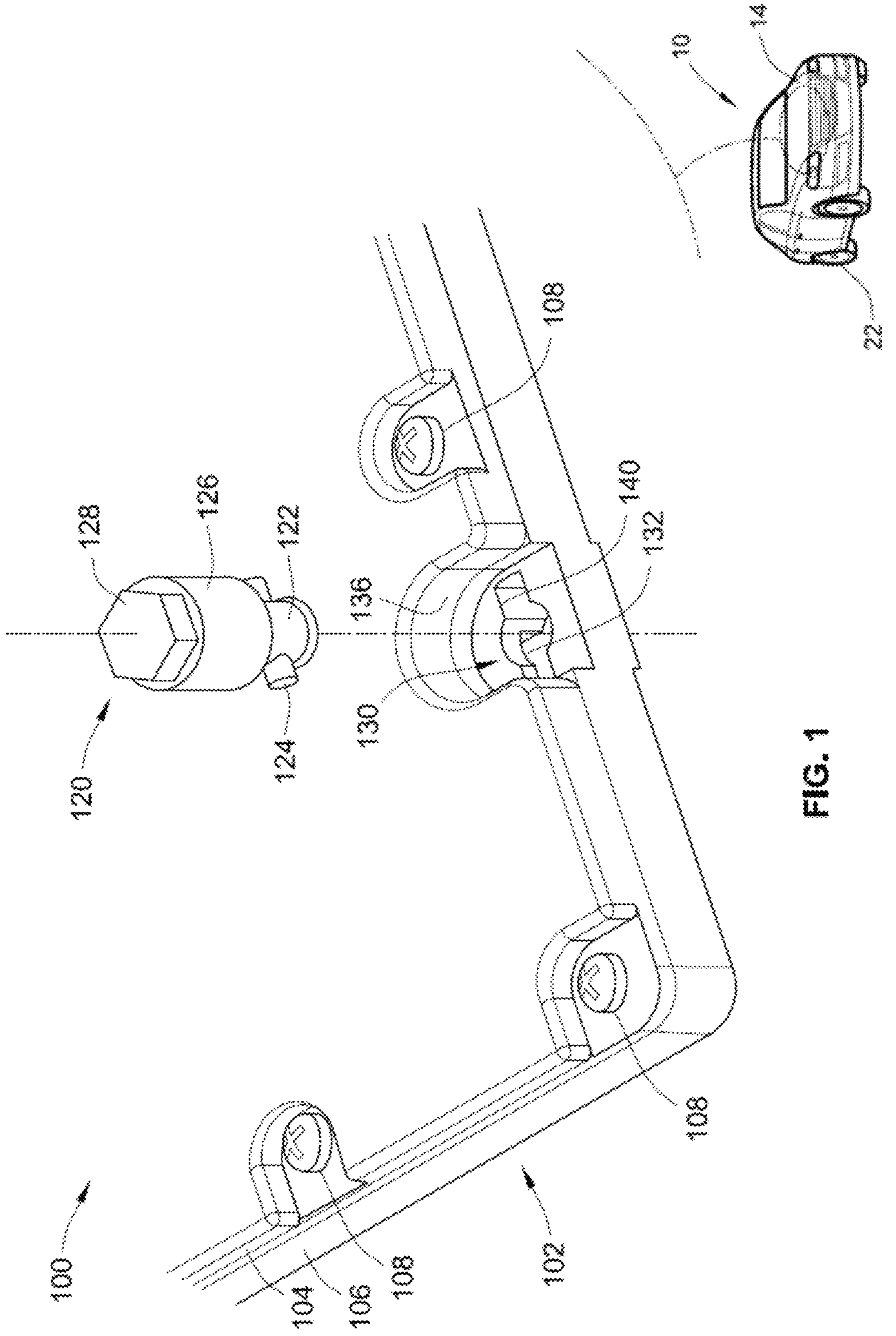
FIG. 1 is a perspective-view illustration of a representative multipart component body with a representative ramp lock extractor (RLE) lift tool for separating the component body from a component support surface in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless explicitly disclaimed: the singular includes the plural and vice versa (e.g., indefinite articles "a" and "an" are to be construed as meaning "one or more" unless expressly disclaimed); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative example of a multipart component, which is designated generally at 100 and portrayed herein for purposes of discussion as a central computer unit (CCU) of an automobile 10 with a vehicle body 14 and multiple road wheels 22. The illustrated vehicle CCU 100 is merely an exemplary application with which aspects of this disclosure may be practiced. In the same vein, utilization of the present concepts for disassembling cast-metal housings of electronic vehicle components should also be appreciated as a non-limiting implementation of disclosed features. As such, it will be understood that aspects and features of this disclosure may be applied to other vehicle components, utilized for disassembling non-metallic and non-electronic devices, and utilized for both automotive and non-automotive applications alike. Moreover, only select features of the vehicle component and lift tool are shown and described in detail below. Nevertheless, the components and tools discussed herein may include numerous additional and alternative features for carrying out the various methods and functions of this disclosure.

The vehicle CCU 100 of FIG. 1 may be typified as an integrated electronic control unit (ECU) that is responsible for governing the dynamic behavior of an automobile, which may include such functions as vehicle throttle, steering, braking, traction control, etc. In the illustrated example, the CCU 100 may include a protective and weatherproof bipartite CCU cartridge 102 that is composed of a first (top) cartridge shell 104 that is securely mounted onto a second (bottom) cartridge shell 106, e.g., by a distributed array of panhead hex-socket screws 108. The mating cartridge shells 104, 106 may be formed from cast aluminum or other rigid yet thermally conductive material that facilitates the dissipation of heat from the CCU 100. Although not visible in the views provided, one or more system-on-chip (SOC) printed circuit board assemblies (PCBA) may be sealed inside of the CCU cartridge 102 and operatively interconnected with other resident vehicle subsystems via a series of connector terminals that mate with assorted external electrical connectors (not shown).

Figure 3:
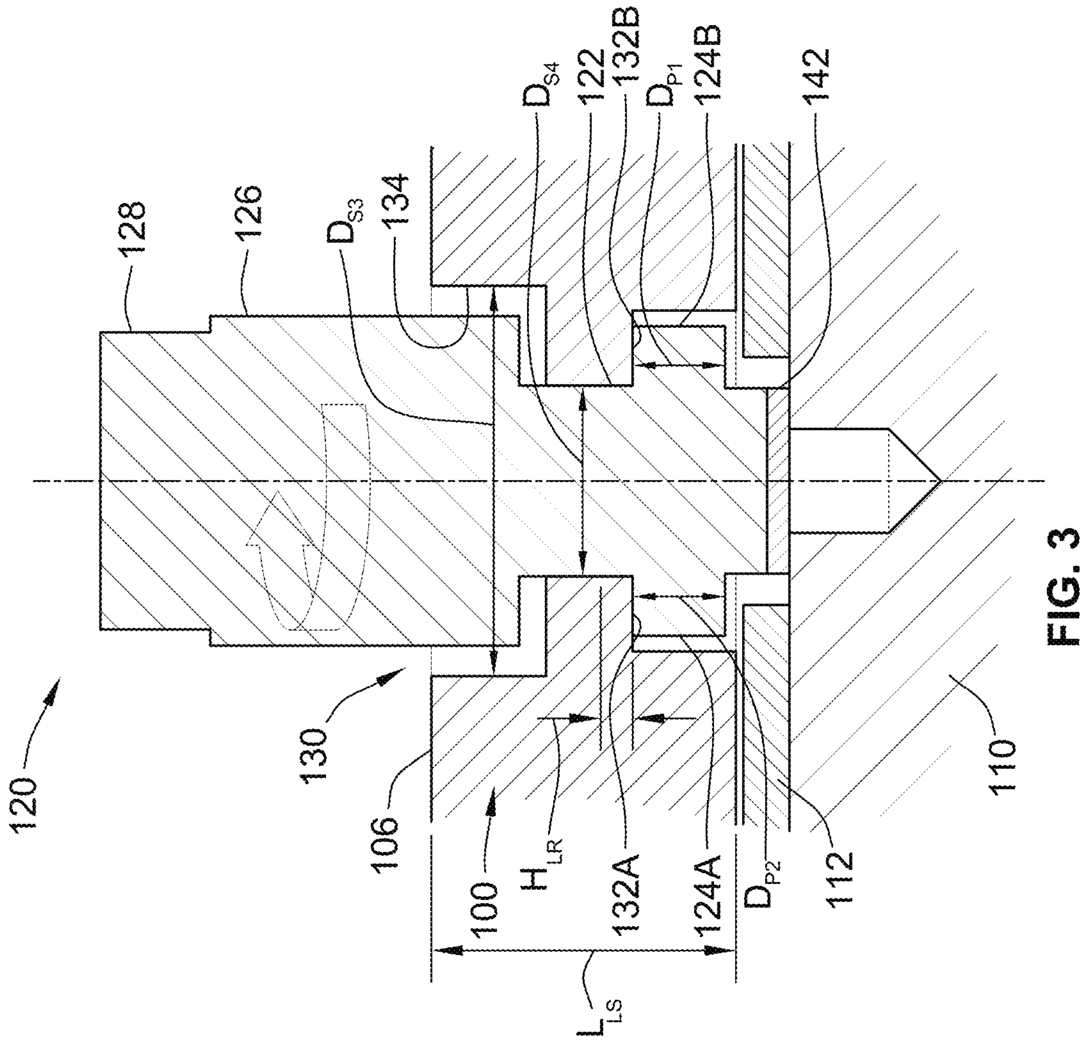
FIG. 3 is a cross-sectional, side-view illustration of the representative RLE lift tool of FIG. 1 inserted into the RLE key slot and rotated to thereby separate the representative multipart component body from the component support surface in accordance with aspects of the present disclosure.

As best seen in FIG. 3, the CCU 100 is securely mounted onto a cast-aluminum chassis 110 of an electronic drive unit (EDU) by a thermally conductive adhesive, such as a composite thermal interface material (TIM) paste 112. The EDU may be an integrated powertrain unit that contains an electric traction motor/generator unit (MGU), an automatic transmission, and a traction power inverter module (TPIM). For purposes of the following discussion, the CCU cartridge 102 may be a representative example of a "first component body" and the cast-aluminum chassis 110 may be a representative example of a "second component body". Nevertheless, it is envisioned that the CCU 100 may take on alternative form factors and may be bonded onto a different vehicle component without departing from the intended scope of this disclosure.

During use of the vehicle CCU 100, the cartridge 102 or the CCU's internal electronics may become damaged and need to be repaired or replaced with a new "in-service condition" unit. However, the TIM paste 112 securing the CCU 100 to the EDU chassis 110 creates a weld-like joint that is not easily broken with standard hand tools to allow for such removal and servicing of the CCU 100. Discussed below are ramp lock extractor lift tools, systems, and methods for facilitating the simplified and efficient removal of the vehicle CCU 100 without damaging the cartridge 102 or the chassis 110. By way of non-limiting example, a helical ramp feature is incorporated into a cast-aluminum upper housing body of a first component that is bonded to a cast-aluminum lower housing body of a second component. A machined-steel lift tool has pins or ribs with curved surfaces that slide on the ramped surfaces of the helical ramp feature by applying a rotating torque to the lift tool. Utilizing the mechanical advantage between the helical ramp feature and the lift tool pins/ribs, the lift tool pushes the upper housing body away from the lower housing body and concomitantly breaks the adhesive bond between the mating surfaces of the first and second components.

In at least some system configurations, the helical ramp feature is integrally formed via aluminum casting into the upper housing body; if desired, multiple ramp features may be formed into a single component. Comparatively, the lift tool may be precision machined from high-strength stainless steel and may be fabricated as a standalone tool (e.g., integrated into a handheld tool) or as an interchangeable tool bit (e.g., releasably attachable to a socket wrench or power screwdriver). An optional nylon pad may be inserted in between the lower housing body and a terminal end surface of the guided diameter of the lift tool to facilitate rotation of the lift tool without denting or otherwise damaging the lower housing body. The adhesive TIM paste material may be sandwiched between the mating surfaces of the upper and lower housing bodies; a select section of the mating surface may be sans TIM paste to allow for unimpeded rotation of the lift tool against the housing body.

During part-to-part assembly, the bottom face of the cast-aluminum upper housing body is bonded via adhesive TIM paste to a top face of the cast-aluminum lower housing body. During part service, a guided-diameter bottom end of the machined-steel lift tool is inserted into an open top end of the helical ramp feature in the upper housing body. The lift tool is pressed downward through the helical ramp feature until a nylon pad on the distal tip of the lift tool abuts the lower housing body and the rounded pins/ribs of the lift tool align with the helical path of the ramp feature. A torsional force is applied to the lift tool such that the tool's stem rotates one quarter turn and the tool's pins/ribs slide on the helical ramp feature; doing so presses the lift tool and nylon pad against the lower housing body surface while concomitantly applying a lift force to the upper housing body. The lift force causes the adhesive TIM paste to fracture and the upper housing body to lift off of the lower housing body.

Figure 2:
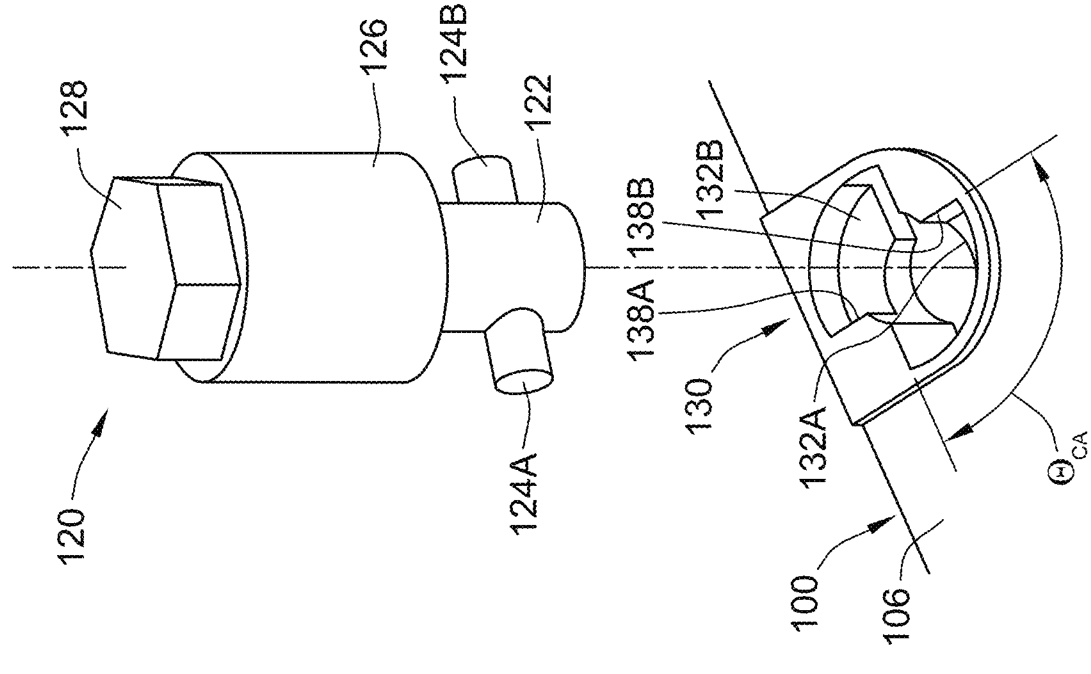
FIG. 2 is an enlarged perspective-view illustration of the representative RLE lift tool of FIG. 1 juxtaposed with a complementary RLE key slot in the representative multipart component body in accordance with aspects of the present disclosure.

Turning next to FIG. 2, a non-limiting example of a ramp lock extractor (RLE) lift tool 120 is shown juxtaposed with a non-limiting example an RLE key slot 130 that extends through the bottom cartridge shell 106 half of the CCU cartridge 102. The illustrated RLE lift tool 120 includes an elongated tool stem 122 with one or more sliding ramp pins 124 that project outward from one or more lateral sides of the stem 122. For simplicity of design and use, the RLE lift tool 120 may be fabricated with a first (left) ramp pin 124A, which projects radially outward from a first (left) lateral side of the stem 122, and a second (right) ramp pin 124B, which projects radially outward from a second (right) lateral side of the stem 122. The first ramp pin 124A may be diametrically opposite the second ramp pin 124B such that the two pins 124A, 124B project in opposite directions from each other. It is envisioned that the RLE lift tool 120 may include greater or fewer than two ramp pins 124, may include ramp pins 124 that are arranged in different patterns, and/or may include ramp pins 124 that are coplanar or axially offset from one another.

To facilitate alignment, mating, and sliding contact of the ramp pins 124 with helical ramps 132 of the RLE key slot 130, the first ramp pin 124A may have a first cylindrical shape with a first (pin) diameter $D_{P1}$, and the second ramp pin 124B may have a second cylindrical shape with a second (pin) diameter $D_{P2}$ (FIG. 3). For simplicity of design and manufacture, both ramp pins 124A, 124B may share a common cylindrical shape with a shared common diameter (i.e., diameter $D_{P1}$=diameter $D_{P2}$). In accord with the illustrated example, both ramp pins 124A, 124B are right-circular cylinders in which the cylinder's longitudinal length is smaller than its diameter. Alternative designs may employ cylindrical ramp pins with oval, elliptical, or tear-drop shaped cross-sections. Unlike other commercially available lift tool designs, the lift tool 120 may be characterized by a lack of helical threads, a lack of movably attached parts, and/or a lack of electric parts.

For lift tool configurations designed to operatively mate with a complementary hand tool or power tool, the RLE lift tool 120 may include an elongated hex-head drive shank 126 with a hexagonal crown 128 projecting from a proximal (top) end of the shank 126 and the tool stem 122 projecting coaxially from a distal (bottom) end of the shank 126. In this instance, the hexagonal crown 128 of the hex-head drive shank 126 may insert into a hexagonal drive socket (not shown) of a hand-powered tool (e.g., a socket wrench or multi-bit screwdriver) or a motor-powered tool (e.g., tool chuck of a power screwdriver). As best seen in FIGS. 2 and 3, the hex-head drive shank 126 may have a third cylindrical shape with a third (shank) diameter $D_{S3}$, and the tool stem 122 may have a fourth cylindrical shape with a fourth (stem) diameter $D_{S4}$ that is smaller than the shank diameter $D_{S3}$. In the illustrated example, the pin diameters $D_{P1}$, $D_{P2}$ of the left and right ramp pins 124A, 124B are both smaller than the shank diameter $D_{S3}$ of the hex-head drive shank 126 and the stem diameter $D_{S4}$ of the tool stem 122. It may be desirable that the RLE lift tool 120, including the tool stem 122, ramp pins 124, and drive shank 126 with hexagonal crown 128, be integrally formed as a single-piece structure, e.g., from high-strength metallic, polymeric, and/or composite materials.

In order to remove the vehicle CCU 100 from the EDU chassis 110, the RLE lift tool 120 inserts into and rotates within the RLE key slot 130 that extends through the CCU cartridge 102. The RLE key slot 130 is shown in FIG. 3 with a through-hole 134 that extends from the top surface to the bottom surface of the bottom cartridge shell 106 of the CCU cartridge 102. To facilitate insertion of the lift tool 120 into the key slot 130, the top cartridge shell 104 of the CCU cartridge 102 may be fabricated with keyway pocket 136 (FIG. 1) that is recessed into a lateral edge of the shell 104 and aligned with the key slot 130. The illustrated RLE key slot 130 includes one or more helical ramps 132 that protrude inward from one or more lateral sides of the through-hole 134. By way of example, the RLE key slot 130 may include a first (left) helical ramp 132A, which is located on a first (left) lateral side of the key slot 130 and slidably receives the first ramp pin 124A, and a second (right) helical ramp 132B, which is located on a second (right) lateral side of the key slot 130 and slidably receives the second ramp pin 124B. It is envisioned that the RLE key slot 130 may include greater or fewer than two helical ramps 132, which may be coplanar or axially offset from one another.

FIG. 2 shows the underside surface of the CCU cartridge 102 to more easily view some of the key structural details of the RLE key slot 130. For instance, both helical ramps 132A, 132B may be arcuate with a central arc angle $\Theta_{CA}$ of approximately 90 degrees or less. As a further option, each helical ramp 132A, 132B may terminate at a respective longitudinally elongated ramp wall 138A and 138B that is located at a bottom-most end of that ramp 132 and functions to block further translation of the ramp pin 124 sliding on that ramp 132. Moreover, the key slot's helical ramps 132A, 132B may have a longitudinal ramp height $H_{LR}$ that extends less than half a longitudinal slot length $L_{LS}$ of the RLE key slot 130 (e.g., $H_{LR} \leq 0.10 \cdot L_{LS}$). A top-most end of the RLE key slot 130 may have an irregularly shaped key hole 140 that is shaped and sized to receive therethrough the tool stem 122 and ramp pins 124 of the RLE lift tool 120. Furthermore, the first helical ramp 132A may be diametrically opposite the second helical ramp 132B, with both ramps 132A, 132B descending in the same direction (e.g., clockwise in FIG. 1).

To remove the vehicle CCU 100 from the EDU chassis 110, the bottom end of the RLE lift tool 120 is inserted into the RLE key slot 130 through the key hole 140. Once inserted, the lift tool 120 is translated rectilinearly downward until the distal tip of the tool stem 122 abuts the upper face of the EDU chassis 110. In FIG. 3, the RLE lift tool 120 is shown with a nylon pad 142 secured to the distal tip of the tool stem 122. In this instance, inserting the lift tool 120 into the key slot 130 will seat the nylon pad 142 against the upper face of the EDU chassis 110. When the tool 120 is fully inserted into the slot 130, each ramp pin 124A, 124B aligns with its respective key slot ramp 132A, 132B. After seating the tool stem 122 tip with the nylon pad 142 against the EDU chassis 110, the RLE lift tool 120 is rotated within the RLE key slot 130, e.g., one quarter turn or approximately 90° counterclockwise in FIG. 1. Rotating the lift tool 120 causes the ramp pins 124A, 124B to slide along the descending underside surfaces the helical ramps 132A, 132B. Sliding of the pins 124 on the ramps 132 causes the distal tip of the tool stem 122 to press against the EDU chassis, which in turn causes the adhesive TIM paste 112 to rupture and the CCU cartridge 102 to separate from the chassis 110.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of separating a first component body from a second component body, the first and second component bodies being joined together via an adhesive, the method comprising:

aligning a ramp lock extractor (RLE) lift tool with an RLE key slot extending through the first component body, the RLE lift tool including a tool stem with a plurality of ramp pins projecting outward from lateral sides of the tool stem, and the RLE key slot including a through-hole with a plurality of helical ramps located inside the RLE key slot on lateral sides of the through-hole;

inserting the RLE lift tool into the RLE key slot such that the ramp pins are inside the RLE key slot and a distal tip of the tool stem abuts the second component body; and rotating the RLE lift tool within the RLE key slot such that the ramp pins slide along underside surfaces of the helical ramps causing the distal tip of the tool stem to press against the second component body and thereby separate the first component body from the second component body.

2. The method of claim 1, wherein the plurality of ramp pins includes first and second ramp pins projecting radially outward from opposing first and second lateral sides, respectively, of the tool stem.

3. The method of claim 2, wherein the first ramp pin has a first cylindrical shape with a first diameter, and the second ramp pin has a second cylindrical shape, substantially the same as the first cylindrical shape, with a second diameter, substantially the same as the first diameter.

4. The method of claim 3, wherein the first and second cylindrical shapes are right-circular cylinders, and wherein the first ramp pin is diametrically opposite the second ramp pin.

5. The method of claim 3, wherein the RLE lift tool further includes a hex-head drive shank with the tool stem projecting coaxially from a distal end of the hex-head drive shank, the method further comprising inserting the hex-head drive shank of the RLE lift tool into a hexagonal drive socket of a manual tool handle or an electric power drill.

6. The method of claim 5, wherein the hex-head drive shank has a third cylindrical shape with a third diameter, and the tool stem has a fourth cylindrical shape with a fourth diameter smaller than the third diameter.

7. The method of claim 6, wherein the first and second diameters of the first and second ramp pins are smaller than the third diameter of the hex-head drive shank and the fourth diameter of the tool stem.

8. The method of claim 1, wherein the RLE lift tool, including the tool stem and the plurality of ramp pins, is integrally formed as a single-piece structure.

9. The method of claim 1, wherein the plurality of helical ramps includes first and second helical ramps located on opposing first and second lateral sides, respectively, of the RLE key slot.

10. The method of claim 9, wherein the first and second helical ramps are arcuate with a central arc angle of approximately 90 degrees or less.

11. The method of claim 10, wherein the first and second helical ramps terminate at first and second ramp walls, respectively, and wherein the first and second helical ramps have a longitudinal height extending less than half a longitudinal length of the RLE key slot.

12. The method of claim 1, wherein the distal tip of the tool stem includes a nylon pad, and wherein inserting the RLE lift tool into the RLE key slot seats the nylon pad against the second component body.

13. The method of claim 1, wherein the first component body is formed from a first metallic material, the second component body is formed from a second metallic material, the RLE lift tool is formed from a third metallic material distinct from and stiffer than the first and second metallic materials, and the adhesive is a thermally conductive metal-to-metal adhesive.

14. A ramp lock extractor (RLE) lift tool for separating a first component body from a second component body, the first and second component bodies being joined together via an adhesive, the RLE lift tool comprising:

a cylindrical tool stem formed from a metallic material, the tool stem configured to align with and insert into an RLE key slot extending through the first component body, the RLE key slot including a through-hole with first and second helical ramps located inside the RLE key slot on opposing first and second lateral sides, respectively, of the through-hole, a distal tip of the tool stem configured to abut the second component body by inserting the RLE lift tool into the RLE key slot;

a cylindrical first ramp pin integrally formed with and projecting radially outward from a first lateral side of the tool stem; and a cylindrical second ramp pin integrally formed with and projecting radially outward from a second lateral side of the tool stem diametrically opposite the first ramp pin, wherein the tool stem is configured to rotate within the RLE key slot; and wherein the first and second ramp pins are configured to insert into the RLE key slot and slide along underside surfaces of the first and second helical ramps, respectively, when rotating the RLE lift tool within the RLE key slot such that the distal tip of the tool stem presses against the second component body to thereby rupture the adhesive and lift the first component body from the second component body.

15. A ramp lock extractor (RLE) system, comprising:

a first component body configured to mount onto a second component body via an adhesive, the first component body including an RLE key slot extending through the first component body, the RLE key slot including a through-hole with a plurality of helical ramps located inside the RLE key slot on lateral sides of the through-hole; and an RLE lift tool including a tool stem with a plurality of ramp pins projecting outward from lateral sides of the tool stem, wherein the tool stem is configured to align with and insert into the RLE key slot such that the ramp pins are inside the RLE key slot and a distal tip of the tool stem abuts the second component body, wherein the tool stem is configured to rotate within the RLE key slot, and wherein the ramp pins are configured to slide along underside surfaces of the helical ramps when rotating the RLE lift tool within the RLE key slot such that the distal tip of the tool stem presses against the second component body to thereby separate the first component body from the second component body.

16. The RLE system of claim 15, wherein the plurality of ramp pins includes first and second ramp pins projecting radially outward from opposing first and second lateral sides, respectively, of the tool stem.

17. The RLE system of claim 16, wherein the first ramp pin has a first cylindrical shape with a first diameter, and the second ramp pin has a second cylindrical shape, substantially the same as the first cylindrical shape, with a second diameter, substantially the same as the first diameter.

18. The RLE system of claim 17, wherein the RLE lift tool, including the tool stem and the plurality of ramp pins, is integrally formed as a single-piece structure.

19. The RLE system of claim 15, wherein the plurality of helical ramps includes first and second helical ramps located on opposing first and second lateral sides, respectively, of the RLE key slot.

20. The RLE system of claim 19, wherein the first and second helical ramps are arcuate with a central arc angle of approximately 90 degrees or less.

* * * * *